United States Patent [19]

Deremince et al.

[11] Patent Number: 5,342,603
[45] Date of Patent: Aug. 30, 1994

[54] PROCESS FOR THE MANUFACTURE OF HYDROGEN PEROXIDE

[75] Inventors: Veronique Deremince, Wavre; Claude Vogels, Lasne, both of Belgium

[73] Assignee: Interox International, Brussels, Belgium

[21] Appl. No.: 990,198

[22] Filed: Dec. 14, 1992

[30] Foreign Application Priority Data

Dec. 12, 1991 [BE] Belgium ............... 09101132

[51] Int. Cl.$^5$ ........................................... C01B 15/023
[52] U.S. Cl. ........................... 423/588; 502/228; 502/230
[58] Field of Search ............ 423/588, 589, 590; 502/230

[56] References Cited

U.S. PATENT DOCUMENTS

| | | | |
|---|---|---|---|
| 2,657,980 | 11/1949 | Sprauer | 423/588 |
| 3,338,843 | 8/1967 | Goble et al. | 502/230 |
| 3,524,808 | 8/1970 | Quik et al. | 502/230 |
| 3,635,841 | 1/1972 | Keith et al. | 423/588 |
| 3,717,586 | 2/1973 | Suggitt et al. | 502/230 |
| 4,032,474 | 6/1977 | Goudriaan et al. | 502/230 |
| 4,061,598 | 12/1977 | Makar | 423/588 |
| 4,800,075 | 1/1989 | Jenkins | 423/588 |
| 4,919,786 | 4/1990 | Hamner et al. | 502/230 |
| 5,039,638 | 8/1991 | Cymbaluk et al. | 502/230 |
| 5,182,248 | 1/1993 | Cody et al. | 502/230 |

*Primary Examiner*—Wayne Langel
*Attorney, Agent, or Firm*—Oblon, Spivak, McClelland, Maier & Neustadt

[57] ABSTRACT

Process for the manufacture of hydrogen peroxide by alkylanthraquinone oxidation (AO process) in which the hydrogenation stage of the alkylanthraquinones is carried out in the presence of a catalyst containing palladium supported on alumina granules which have been subjected to a halogenation treatment prior to fixing the palladium.

7 Claims, No Drawings

PROCESS FOR THE MANUFACTURE OF HYDROGEN PEROXIDE

The invention relates to a process for the manufacture of hydrogen peroxide according to the alkylanthraquinone oxidation technique.

According to this technique, hydrogen peroxide is manufactured by a cyclic process comprising three main stages consisting, in a first stage, in hydrogenating an organic working solution containing at least one alkylanthraquinone and/or at least one tetrahydroalkylanthraquinone, in order to produce one or more alkylated anthrahydroquinones and/or tetrahydroanthrahydroquinones. The working solution containing the alkylated anthrahydroquinones and/or the alkylated tetrahydroanthrahydroquinones is then, in a second stage, subjected to oxidation by means of oxygen, air or oxygen-enriched air in order to provide hydrogen peroxide and to reform the alkylanthraquinones and/or tetrahydroalkylanthraquinones. The hydrogen peroxide formed is then separated from the organic working solution in a third stage by extraction with water, the hydrogen peroxide being recovered in the aqueous phase. The organic working solution containing the alkylanthraquinones and/or the tetrahydroalkylanthraquinones is then recycled to the first, hydrogenation, stage in order to recommence the hydrogen peroxide production cycle.

It has been known for a long time (U.S. Pat. No. 2,657,980 on behalf of du Pont de Nemours) to carry out the first stage of reduction of the organic solution of alkylanthraquinones by catalytic hydrogenation in the presence of metallic palladium. This palladium can advantageously be fixed on a solid support such as, for example, alumina.

This known process, however, has the disadvantage of giving rise to the formation of undesirable hydrogenated compounds such as oxanthrone and anthrone which accumulate in the organic working solution and whose subsequent oxidation no longer allows hydrogen peroxide to be produced.

The invention is targeted at overcoming this disadvantage of the known process by providing a process which makes it possible to limit the rate of the parasitic hydrogenation reactions of the alkylanthraquinones and the formation of compounds such as oxanthrone, which are undesirable for the production of hydrogen peroxide.

To this end, the invention relates to a process for the manufacture of hydrogen peroxide in three main stages consisting, in a first stage, in hydrogenating an organic solution of alkylanthraquinones and/or of tetrahydroalkylanthraquinones, in oxidising, in a second stage, the organic solution arising from the first stage, by means of air, oxygen or oxygen-enriched air and, in a third stage, in extracting, by means of water, the hydrogen peroxide formed in the second stage, according to which the first, hydrogenation, stage is carried out in the presence of a catalyst made of metallic palladium supported on alumina which has been subjected to a halogenation treatment prior to fixing the palladium.

Alkylanthraquinone is meant to denote the 9,10-anthraquinones substituted in position 1, 2 or 3 with at least one alkyl side chain of linear- or branched-aliphatic type comprising at least one carbon atom, as well as their derivatives which are tetrahydrogenated in positions 5, 6, 7 and 8. Generally, these alkyl chains comprise less than 9 carbon atoms and, preferably, less than 6 carbon atoms. Examples of such alkylanthraquinones are 2-ethylanthraquinone, 2-isopropylanthraquinone, 2-(sec-butyl)anthraquinone, 2-(tert-butyl)anthraquinone, 1,3-, 2,3-, 1,4- and 2,7-dimethylanthraquinone, 2-(iso-amyl)anthraquinone, 2-(tert-amyl)anthraquinone and the mixtures of these quinones. Most often a mixture of alkylanthraquinones and of alkyl-5,6,7,8-tetrahydroanthraquinones is used.

According to the process in accordance with the invention, the alumina of the catalyst support can consist of alumina of alpha, beta or gamma variety or of a mixture of one or more of these varieties. The specific surface of this alumina must be sufficient to ensure that the catalyst has a substantial effectiveness. Generally, it is advisable that this surface, measured according to the BET method, is greater than 30 $m^2/g$ and, preferably, greater than 50 $m^2/g$. Most often, this surface will be less than 300 $m^2/g$ and, preferably, less than 250 $m^2/g$.

Halogenation treatment is meant to denote a treatment which has the purpose of fixing halogen atoms to the surface of the alumina without, however, altering its porosity. According to the invention, the halogenation treatment of the alumina is carried out before fixing the palladium.

The halogenation treatment in accordance with the invention consists, preferably, in subjecting the alumina to at least one treatment chosen from the chlorination, bromination and fluorination treatments. The fluorination treatment has given the best results and is particularly preferred.

The halogenation treatment is generally carried out by bringing alumina into contact with an ammonium halide, followed by a heat treatment at a temperature between 300° and 800° C. The heat treatment is preferably carried out while purging with an inert gas such as nitrogen or a rare gas. Nitrogen has given good results. The ammonium halide can be brought into contact with the alumina either by dry mixing of alumina and ammonium halide as powders or in an aqueous medium by suspending an alumina powder in an aqueous solution of ammonium halide and impregnating the alumina particles by evaporating the solution to dryness.

In the process according to the invention, a quantity of halogen greater than 0.2% of the weight of the alumina of the support used. It is also advisable that the quantity of halogen used according to the process in accordance with the invention does not exceed 15% of the weight of the alumina. The quantity of halogen used in the process according to the invention will preferably be greater than 0.5% of the weight of the alumina. Likewise, catalyst supports will preferably be used in which the halogen has been used at a rate of less than 10% by weight of the alumina.

The quantity of halogen truly fixed to the alumina support is generally substantially less than the quantity used. It is generally a function of the initial state of the alumina and of the conditions of the heat treatment carried out.

According to the invention, the catalyst used in the first, hydrogenation, stage comprises a quantity of palladium fixed to the alumina support such that this quantity is greater than 0.1% by weight with respect to the alumina. It is also advisable that this quantity of palladium is less than 5% by weight with respect to the alumina. Preferably, the quantity of palladium will be greater than 1% by weight with respect to the alumina.

Likewise, it will be preferable to use less than 3% by weight of palladium with respect to the alumina.

In a variant of the process according to the invention, it is possible to use an alumina which has been doped with at least one alkali metal, at least one alkaline-earth metal or a mixture of at least one alkali metal and at least one alkaline-earth metal. Preferably, sodium, potassium or lithium will be chosen as the alkali metal. Calcium or magnesium will preferably be the alkaline-earth metal. The quantity of alkali metal and/or of alkaline-earth metal used to dope the alumina generally does not exceed 5% by weight of the latter and, preferably, does not exceed 1%. It is generally greater than 0.001% by weight and, preferably, greater than 0.005%.

Another variant of the process according to the invention consists in using, in the first, hydrogenation, stage of the process according to the invention, a catalyst supported on an alumina impregnated with at least one other metal oxide chosen from the iron, chromium and molybdenum oxides. The quantity of metal oxide impregnated on the alumina will generally be less than 5% by weight of the latter and, preferably, less than 1%. Generally, this quantity will be greater than 0.01% by weight and, preferably, greater than 0.05%. It is also possible to use an alumina impregnated with metal oxides and doped with at least one alkali metal or one alkaline-earth metal.

The invention also relates to a catalyst for the hydrogenation of an organic solution of alkylanthraquinones used for the manufacture of hydrogen peroxide. According to the invention, the catalyst comprises metallic palladium supported on a halogenated alumina support.

Preferably, the support for the hydrogenation catalyst according to the invention is a fluorinated alumina.

Finally, the invention relates to a process for the manufacture of the catalyst in accordance with the invention according to which an alumina powder is mixed while dry with the requisite quantity of ammonium halide so that the halogen content of the mixture is between 0.2 and 15% by weight with respect to the alumina, the mixture is calcined under an inert atmosphere, the halogenated alumina is then allowed to cool, the halogenated alumina is suspended in an aqueous solution of a soluble palladium salt, metallic palladium is precipitated on the halogenated alumina by progressively increasing the pH of the suspension to a slightly alkaline value, the catalyst obtained is separated and is dried.

The calcination temperature of the alumina mixed with the ammonium halide powder must be greater than 300° C. and, preferably, greater than 350° C. Likewise, it is advisable that this calcination temperature is less than 800° C. and, preferably, less than 700° C. The temperature of 400° C. has given good results.

The time taken for the calcination operation of the alumina depends on the temperature and must be sufficient to drive off every trace of ammonia. Generally, this period is greater than 3 hours and, preferably, greater than 4 hours. Likewise, this calcination period will not generally be greater than 24 hours and, preferably, not greater than 20 hours. A calcination period of 16 hours is highly suitable. The calcination is preferably carried out while purging with an inert gas. The inert gas is advantageously chosen from nitrogen and the rare gases. Nitrogen has given good results.

The separation of the catalyst from the aqueous solution can be carried out by any technique known for separating a solid from a liquid. Separation by filtration has given good results. Additionally, it makes it possible to easily proceed to a possible washing of the catalyst with water before subjecting it to drying. The latter can be carried out by heating at a moderate temperature not exceeding 200° C. or by exposing the catalyst to an atmosphere purged with a hot gas stream which is at a temperature between room temperature and 150° C. The purging gas can be chosen from air or an inert gas such as defined above. Air has given good results.

A variant of the process for the manufacture of the catalyst according to the invention consists in suspending the alumina in an ammonium halide solution and in evaporating to dryness and then in calcining and fixing the palladium as described above.

According to this variant, the volume of the ammonium halide solution is adjusted so that the halogen content of the mixture is between 0.2 and 15% by weight with respect to the alumina.

The examples which follow are given for the purpose of illustrating the invention, without limiting its scope in any way.

EXAMPLE 1

Preparation of the Catalyst a. Halogenation treatment 10 g of alumina were mechanically ground with 2.95 g of $NH_4F$ so as to ensure a F weight of 10% with respect to the alumina. The mixture obtained was then calcined for 16 hours while purging with nitrogen (flow rate 20 ml/min) at a temperature of 400° C. which is reached with a moderate heating rate of 1° C./min.

b. Fixing the palladium 10 g of fluorinated alumina were suspended in 100 ml of water. 26 ml of an acidic solution of $PdCl_2$ (1.2821 g of $PdCl_2$ in 100 ml of N HCl) were then added so as to obtain a palladium content of 2% with respect to the alumina. The palladium is then precipitated on the fluorinated alumina by progressively increasing the pH of the solution to a final value of 8 by addition of 10N NaOH. The catalyst was then filtered, then washed with 300 ml of water and dried at 110° C. for 16 hours while exposed to the air.

EXAMPLE 2

Preparation of the Catalyst a. Halogenation treatment 30 g of alumina were suspended in 100 ml of a $NH_4F$ solution (14.3 g of $NH_4F$ in 250 ml of water). The alumina was then impregnated with the fluoride by evaporating the solution to dryness. Finally, it was calcined at 600° C. under a nitrogen stream for 5 hours.

b. Fixing the palladium

This operation was carried out as in Example 1.

EXAMPLE 3

Hydrogenation Tests

Two catalysts prepared from two commercial aluminas according to the process of Example 2 were used to hydrogenate a solution containing a mixture of alkylanthraquinones in an organic solvent consisting of a mixture of 20% by weight of diisobutylcarbinol and of 80% by weight of a commercial aromatic solvent marketed under the tradename Solvesso 150. The mixture of alkylanthraquinones had the following composition by weight:
- 7% butylanthraquinone
- 40% tert-amylanthraquinone
- 52% sec-amylanthraquinone
- 0.7% tert-amyltetrahydroanthraquinone
- 0.7% sec-amyltetrahydroanthraquinone.

The hydrogenation reaction was carried out in a stirred reactor at 75° C. and under a hydrogen pressure of 2 bar for a length of time of approximately 1 hour.

After hydrogenation, the solution was analysed to determine its oxanthrone content.

The same tests have also been carried out with catalysts obtained from the same commercial aluminas to which palladium has been fixed without subjecting them to prior fluorination treatment.

The results obtained were the following:

| Alumina type | Fluorination treatment | Molar ratio oxanthrones/anthraquinones |
|---|---|---|
| alumina A1 | no | 0.320 |
| alumina A1 | yes | 0.050 |
| alumina A2 | no | 0.340 |
| alumina A2 | yes | 0.085 |

Alumina A2 was an alumina marketed by the firm Rhône-Poulenc as type 501 and alumina A1 was an alumina prepared in the laboratory for the test requirements.

It can be seen that, in both cases, the fluorination treatment has made it possible to greatly reduce the formation of oxanthrone.

We claim:

1. Process for the manufacture of hydrogen peroxide in three main stages consisting, in a first stage, in hydrogenating an organic solution of alkylanthraquinones and/or of tetrahydroalkylanthraquinones, in oxidising by means of air, oxygen or oxygen-enriched air, in a second stage, the organic solution arising from the first stage and, in a third stage, in extracting by means of water the hydrogen peroxide formed in the second stage, according to which the first, hydrogenation, stage is carried out in the presence of a catalyst made of metallic palladium supported on alumina, characterised in that the alumina of the support of the hydrogenation catalyst has been subjected to a halogenation treatment prior to fixing the palladium.

2. The process according to claim 1, characterised in that the halogenation treatment is selected from the group consisting of chlorination, bromination and fluorination treatments.

3. The process according to claim 2, characterised in that the halogenation treatment is a fluorination treatment.

4. The process according to claim 1, characterised in that the alumina of the catalyst support has been additionally doped at a rate of less than 5% of its weight with at least one alkali metal or one alkaline-earth metal.

5. The process according to claim 1, characterised in that the alumina of the catalyst support is additionally impregnated at a rate of less than 5% of its weight with oxides of a metal selected from the group consisting of iron, chromium and molybdenum.

6. The process according to claim 1, characterised in that the alumina of the catalyst support has been treated with a quantity of halogen of between 0.2 and 15% of the weight of the alumina.

7. The process according to claim 1, characterised in that the metallic palladium content of the catalyst is between 0.1 and 5% by weight.

* * * * *